(12) United States Patent
Hochgatterer

(10) Patent No.: US 10,914,088 B2
(45) Date of Patent: Feb. 9, 2021

(54) TELESCOPIC SUPPORT PROP AND LOCKING PIN

(71) Applicant: DOKA GMBH, Amstetten (AT)

(72) Inventor: Thomas Hochgatterer, Amstetten (AT)

(73) Assignee: DOKA GMBH, Amstetten (AT)

( * ) Notice: Subject to any disclaimer, the term of this patent is extended or adjusted under 35 U.S.C. 154(b) by 0 days.

(21) Appl. No.: 16/198,325

(22) Filed: Nov. 21, 2018

(65) Prior Publication Data

US 2020/0157828 A1     May 21, 2020

(51) Int. Cl.
| F16M 11/00 | (2006.01) |
| E04G 25/06 | (2006.01) |
| F16B 41/00 | (2006.01) |
| E04G 25/04 | (2006.01) |

(52) U.S. Cl.
CPC ......... *E04G 25/063* (2013.01); *E04G 25/061* (2013.01); *F16B 41/005* (2013.01); *E04G 2025/042* (2013.01)

(58) Field of Classification Search
CPC ....... E04G 25/06; E04G 25/04; E04G 25/061; E04G 25/063
See application file for complete search history.

(56) References Cited

U.S. PATENT DOCUMENTS

| 1,942,088 A * | 1/1934 | Dietrich | E04G 25/06 254/98 |
| 4,752,057 A * | 6/1988 | Hagemes | E04G 11/483 248/354.5 |
| 5,004,390 A * | 4/1991 | Cumbie | F16B 21/12 411/340 |
| 5,160,109 A * | 11/1992 | de Leeuw | E04G 11/483 248/354.4 |
| 8,528,873 B2 * | 9/2013 | Domenig | A47B 57/20 211/70 |

FOREIGN PATENT DOCUMENTS

| FR | 1356174 A | 6/1964 |
| GB | 1148656 A | 4/1969 |

* cited by examiner

*Primary Examiner* — Amy J. Sterling
(74) *Attorney, Agent, or Firm* — McCoy Russell LLP

(57) ABSTRACT

The disclosure relates to a telescopic support prop, which has a leg with a lower leg part and an upper leg part. The upper leg part has a plurality of vertically spaced through holes. A locking pin is releasably connected to one of the vertically spaced through holes of the upper leg part. A cap is connected to the locking pin, the cap having a fastening sleeve put over an end of the locking pin, the cap further having a spring for bearing against the exterior of the lower leg part.

20 Claims, 11 Drawing Sheets

Fig. 2A
Fig. 2B
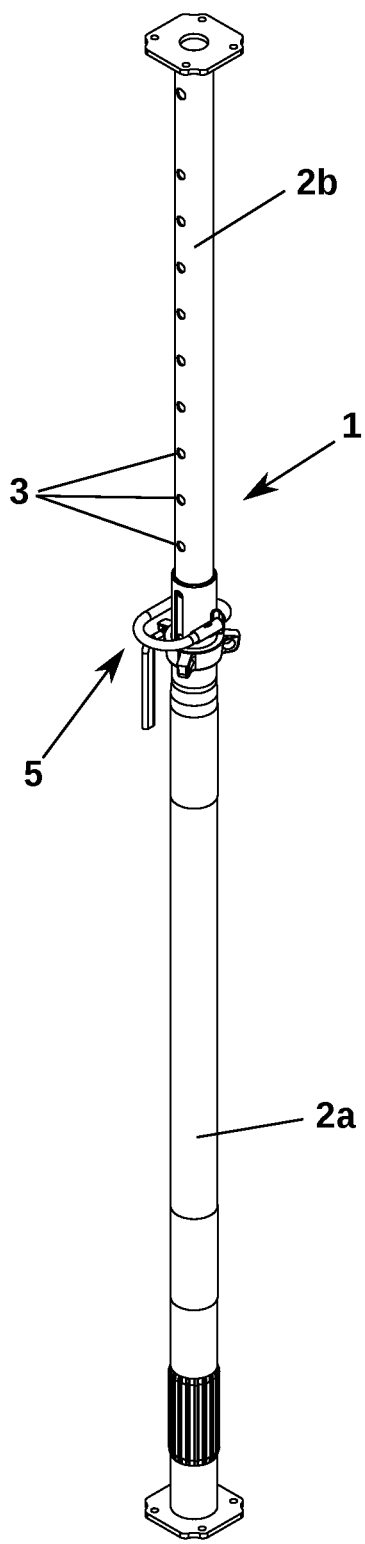
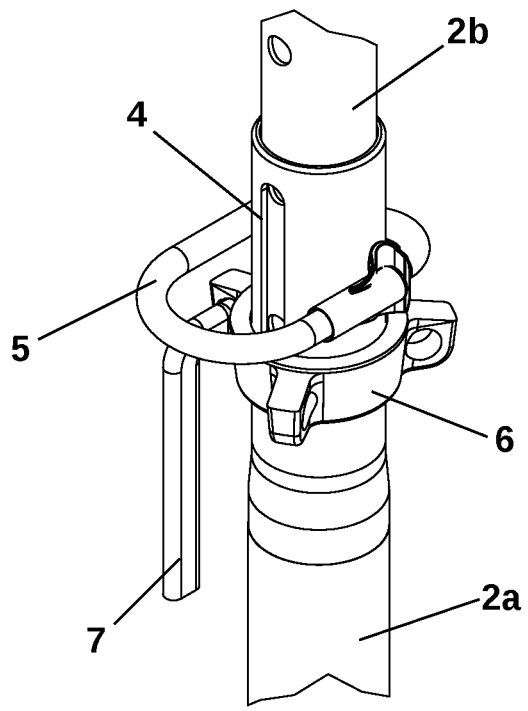

Fig. 3A
Fig. 3B
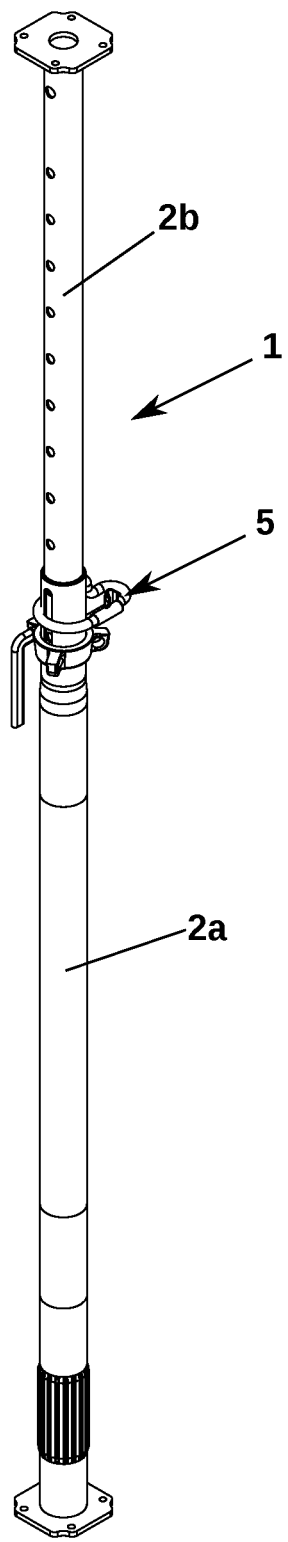
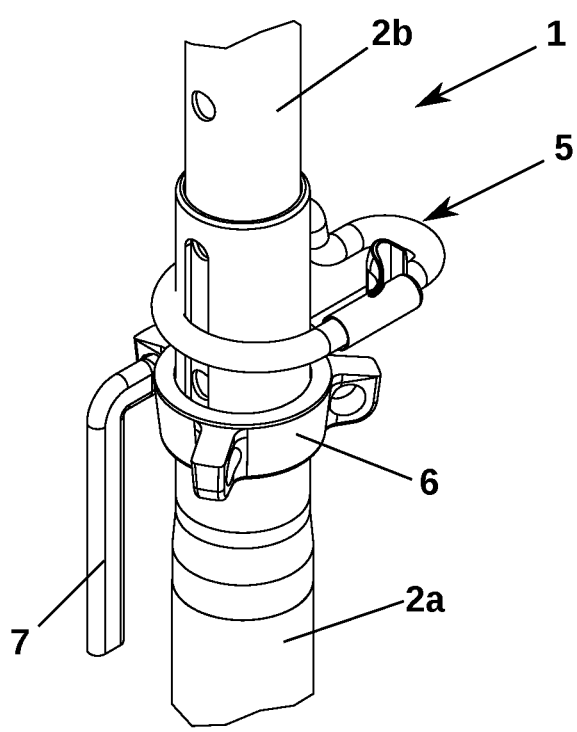

Fig. 4A
Fig. 4B
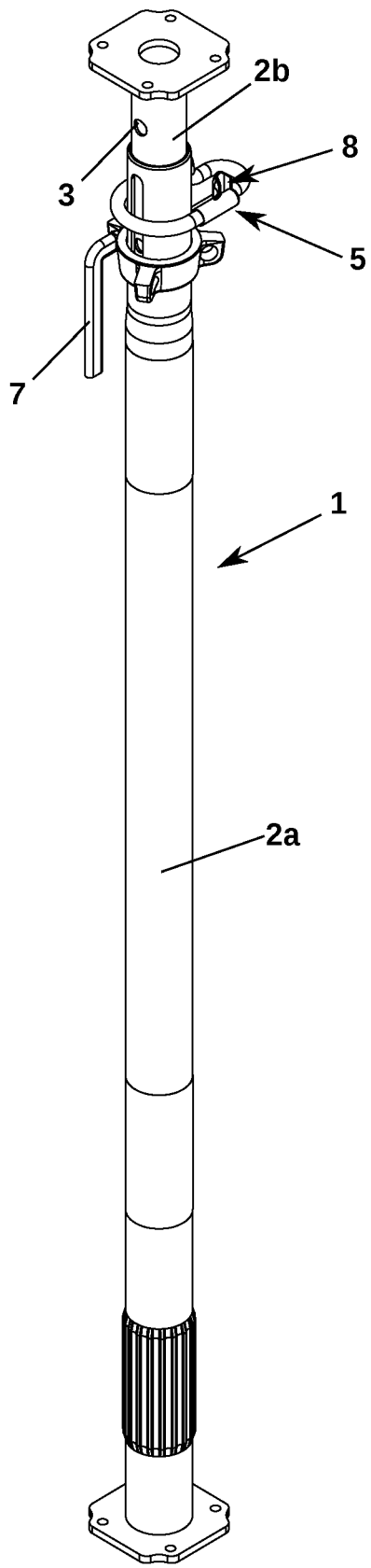
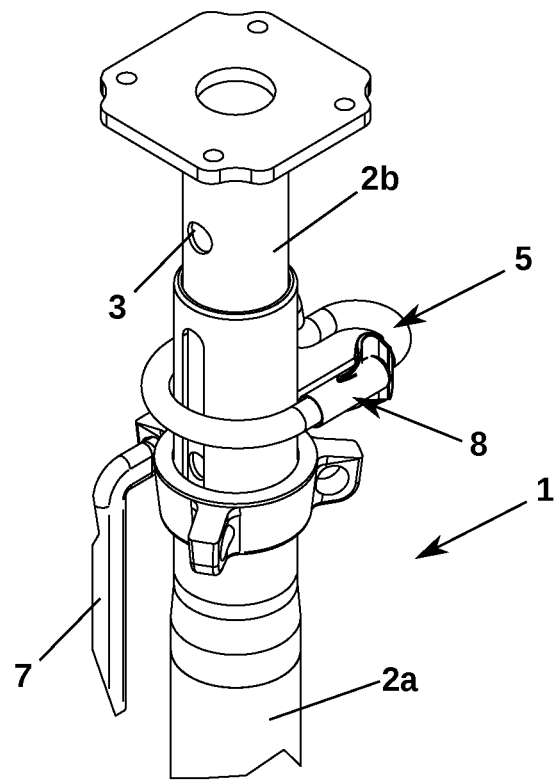

Fig. 9A
Fig. 9B
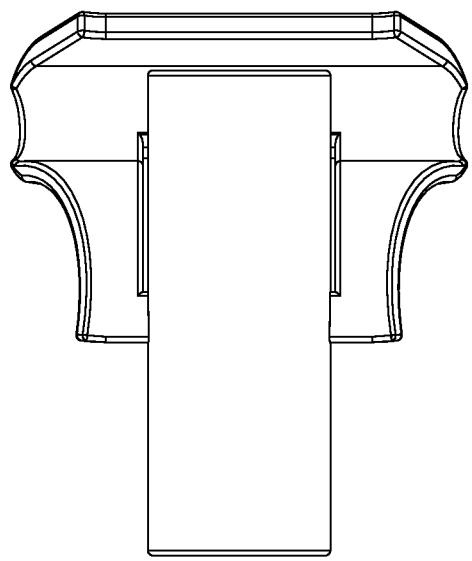
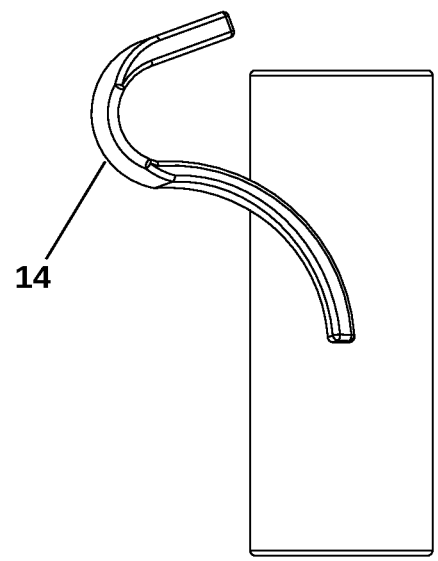
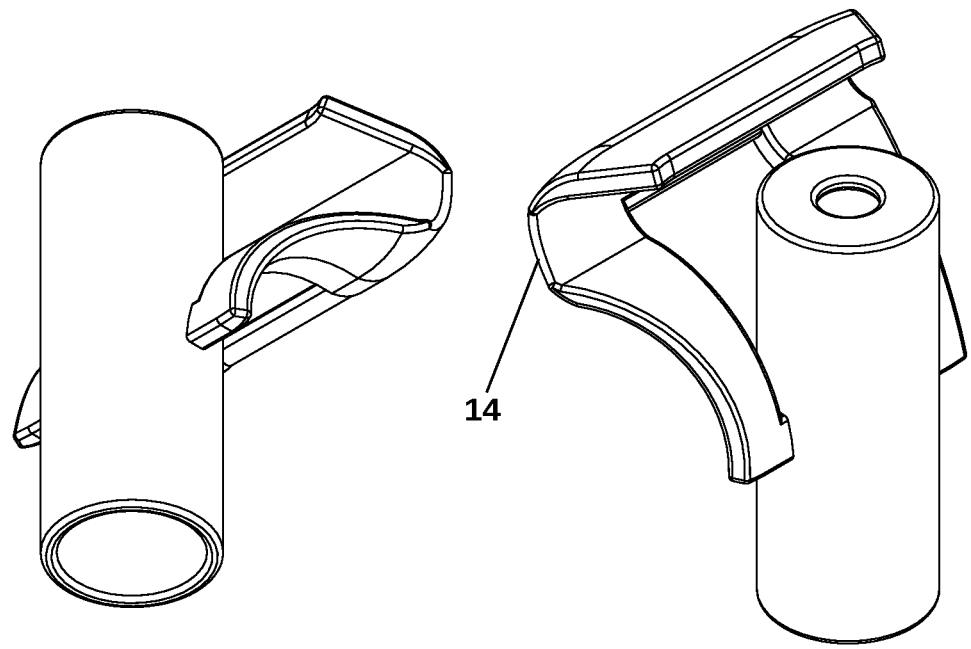
Fig. 9C
Fig. 9D

TELESCOPIC SUPPORT PROP AND LOCKING PIN

FIELD OF THE PRESENT DISCLOSURE

The present disclosure generally relates to telescopic support props, which may include locking pins for securing such telescopic support props at a given length.

DESCRIPTION OF THE RELATED ART AND OBJECT OF THE PRESENT DISCLOSURE

A telescopic support prop with a locking pin may be used to secure an upper member of the telescopic support prop against axial movement relative to a lower member of the telescopic support prop. In a commonly used design of such locking pins, see for example FR 1 356 174, the pin may be horizontally moved from a locked position to an unlocked position. In the locked position, a linear portion of the pin extends through a pair of holes in the upper member. The pin further has a U-shaped bend corresponding to the outer shape of the lower member. In the unlocked position, the U-shaped bend abuts on the lower member. In this way, the pin cannot fall off the prop when the pin is unlocked.

However, a drawback of the locking pin design of FR1 356 174 is that the locking pin may inadvertently be displaced into the unlocked position which would result in the upper member unintentionally retracting into the lower member. This may be disadvantageous in a number of ways, including for safety reasons.

On the other hand, GB 1,148,656 discloses a simpler design for a locking pin to be used in a telescopic support prop. In GB 1,148,656, the pin has a linear section inserted into two opposed openings of the support prop and means for retaining the pin in position. For this purpose, the rear end of the locking pin is provided with a retaining clip formed from a length of resilient wire. The retaining clip has a U-shaped-portion with one limb extending through a hole in the pin shank. When the locking pin is inserted within a pair of diametrically opposed through holes in the inner tube, the retaining clip is bowed outwardly away so as to permit the retaining clip to pass over the exterior of the outer tube. In the locked position, the pin may only be withdrawn against the force of the flexible retaining clip. However, the locking pin is not prevented from being separated from the telescopic support prop.

It is thus an object of the disclosure to alleviate at least some of the drawbacks associated with the prior art.

SUMMARY OF THE PRESENT DISCLOSURE

In an example, the telescopic support prop comprises a leg with a lower leg part and an upper leg part, the upper leg part having a plurality of vertically spaced through holes, a locking pin releasably connected to one of the vertically spaced through holes of the upper leg part, and a cap connected to the locking pin, the cap having a fastening sleeve put over an end of the locking pin, the cap further having a spring for engagement by the exterior of the lower leg part. The locking pin is moved horizontally from a locked position into an unlocked position to allow telescopic movement of the support prop. In the unlocked position, the locking portion of the locking pin is disengaged from the through-hole of the support prop. The spring provided on the locking pin is arranged such that the unlocking of the locking pin requires overcoming a spring force provided by the spring. To this end, the spring is engaged by the exterior of the lower leg part so that the spring elastically bends outwards when the locking pin is moved transversely into the unlocked position. This construction helps to avoid an inadvertent telescopic movement of the support prop which would result from an unintentional transfer of the locking pin into the unlocked position. This example is particularly favorable in that existing designs of locking pins may be easily upgraded by including a cap with the spring. For this purpose, the cap is slid over the outer end of the locking pin. The opposite inner end of the locking pin is formed by a linear locking portion that extends through one of the vertically spaced through holes, typically provided as pairs of diametrically opposed through-holes. As desired, the cap may be permanently or releasably connected to the outer end of the locking pin.

For the purpose of this disclosure, all directions and positions, such as "upwards", "downwards", "upper", "lower", "vertical", "horizontal", are given with respect to an intended use of the telescopic support prop in an upright (vertical) position. It is, however, possible to use the telescopic support prop in different ways, for example in an inclined or upside-down position, in which case the directions and positions are to be translated accordingly.

In example, the fastening sleeve has an insertion opening at the one end and a front wall at the other end. Preferably, an inner diameter of the fastening sleeve corresponds to the outer diameter of the outer end of the locking pin. The front wall limits the extent to which the cap is slid over the outer end of the locking pin.

In an example, the cap is made of a plastic material and the locking pin is made of a metal material. Thus, the required stability is provided by the metal material of the locking pin, whereas the cap with the spring may be simply made of a plastic material.

In an example, the spring freely projects from an outer side of the fastening sleeve of the cap. In this embodiment, the spring may extend away from a cylindrical outer surface of the fastening sleeve (i.e. not from the plain front wall of the fastening sleeve).

In an example, the spring is a flat spring. This construction allows for an easy elastic deflection of the spring when the spring is engaged by the exterior of the lower leg part during unlocking of the locking pin.

In an example, the spring has a curved bearing area for bearing against the leg. This feature helps avoid a jamming of the locking pin during unlocking the support prop.

In an example, the curved bearing area of the cap is cylindrical. In this example, the curved bearing area is curved in but one direction.

In another example, the curved bearing area of the cap is curved in two orthogonal directions. In this example, the curved bearing area may be spherical.

In an example, the spring has a cut-out. This example facilitates the deflection of the spring during unlocking of the support prop.

In an example, the cut-out extends between two flanges connected to diametrically opposed sides of the fastening sleeve. This construction provides for a reliable connection between the spring and the fastening sleeve.

In an example, the cut-out extends inwards from a free end of the spring.

In an example, the cut-out is rectangular.

In another example, the spring is connected to a front wall of the fastening sleeve. In this example, the spring may have an annular member. Further, in this example, a central axis of the annular member of the spring may be collinear with a central axis of the fastening sleeve. Further, in an example, a flexing portion may connect the annular member to the fastening sleeve. Thus, the annular member may be essentially rigid, whereas the deflection required for the unlocking of the support prop is provided by the flexing portion connecting the annular member to the fastening sleeve.

In an example, a locking pin for securing an upper leg part against a lower leg part of a telescopic support prop comprises a pin for connection to a through hole of the telescopic support prop, and a cap connected to the pin, the cap having a fastening sleeve put over an end of the pin, the cap further having a spring for bearing against the leg.

In an example, the locking pin comprises a first linear portion for connection to the through hole of the telescopic support prop; a second and a third linear portion extending in parallel to the first linear portion at diametrically opposed sides of the telescopic support prop; a first curved portion connecting the first linear portion to the second linear portion; and a second curved portion connecting the second linear portion to the third linear portion, the third linear portion carrying the cap.

In this example, the second curved portion is arranged at distance from the leg in a locked position, whereas the second curved portion strikes against the leg during unlocking, for example when the locking pin is moved transversely to the support prop with the help of an instrument.

In another example, a telescopic support prop comprises a leg with a lower leg part and an upper leg part, the upper leg part having a plurality of vertically spaced through holes, and a locking pin for securing the upper leg part against axial movement relative to the lower leg part, the locking pin having a linear locking portion for insertion into one of the plurality of vertically spaced through holes of the upper leg part, the locking pin further having a curved retention portion with an inner diameter corresponding to an outer diameter of the lower leg part, the locking pin further having a spring portion adjoining the curved retention portion, the spring portion being engaged by an exterior of the lower leg part when moving the locking pin from a locked position to an unlocked position.

This example is particularly favorable in that the curved retention portion prevents a separation of the locking pin from the leg as the curved retention portion comes into abutment with the exterior of the lower leg part when the locking pin is moved from the locked to the unlocked position. On the other hand, the spring portion at the outer end of the locking pin provides a spring force that needs to be overcome for the horizontal movement of the locking pin from the locked to the unlocked position, which helps avoid an inadvertent unlocking of the support prop and thus the unintended collapse of the support prop.

BRIEF DESCRIPTION OF THE DRAWINGS

Other objects and features of the present disclosure will become apparent from the following detailed description considered in connection with the accompanying drawings. It is to be understood, however, that the drawings are designed as an illustration only and not as a definition of the limits of the present disclosure.

FIG. 2A is a view of the telescopic support prop of FIG. 1A in an intermediate position of the locking pin in which a spring on a cap put over the outer end of the locking pin is compressed by the exterior of the lower leg part.

FIG. 2B is a detailed view of the telescopic support prop shown in FIG. 2A.

FIG. 3A is a view of the telescopic support prop of FIG. 1A in an unlocked or release position of the locking pin allowing the telescoping of the upper leg with respect to the lower leg.

FIG. 3B is a detailed view of the telescopic support prop shown in FIG. 3A.

FIG. 4A is a view of the telescopic support prop in a retracted position after releasing the locking pin according to FIG. 3A, 3B.

FIG. 4B is a detailed view of the telescopic support prop shown in FIG. 4A.

FIGS. 9A-9D are views of a fourth example of the detachable cap of the locking pin.

All Figures are shown approximately to scale.

DETAILED DESCRIPTION OF THE DRAWINGS

Figure 1A:
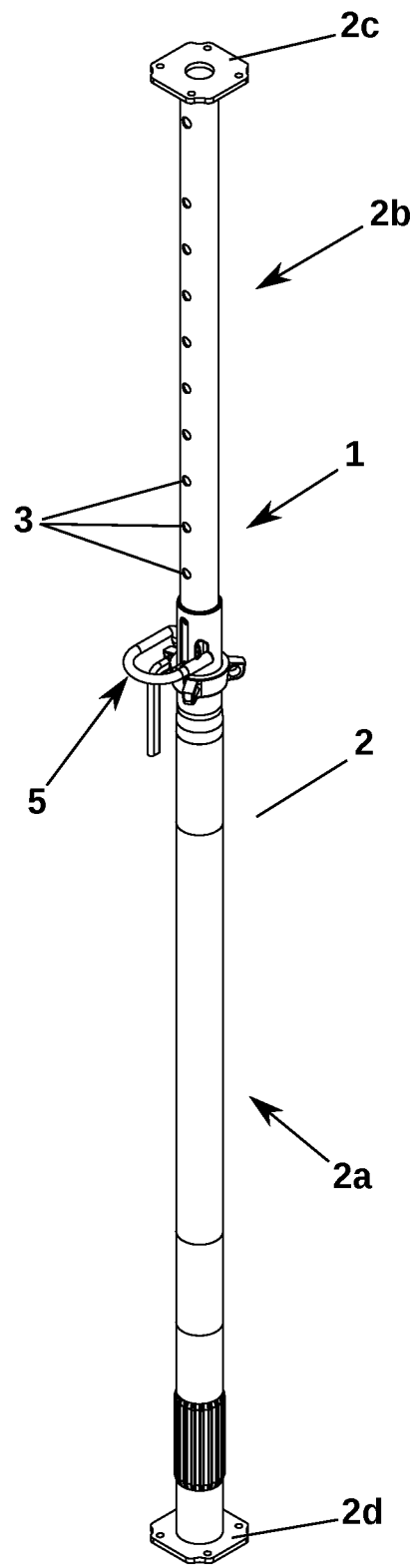
FIG. 1A is a view of a telescoping telescopic support prop with an upper leg secured to a lower leg by means of a locking pin, wherein the locking pin is shown in a locking position fully extending through two diametrically opposed through-holes of the upper leg.
Figure 1B:
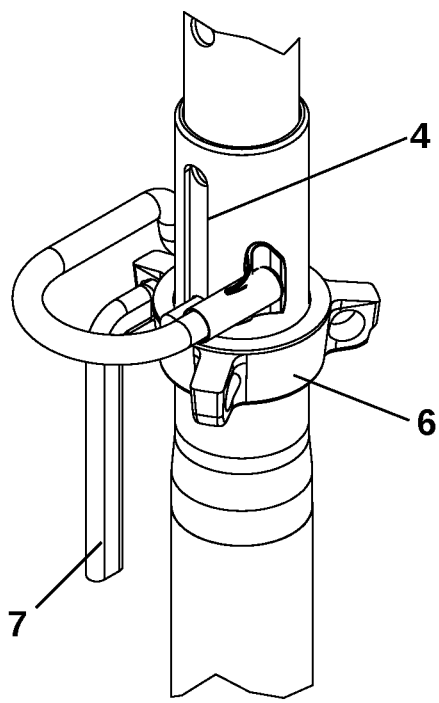
FIG. 1B is a detailed view of the telescopic support prop shown in FIG. 1A.

FIG. 1A shows a telescopic formwork support prop (or support post) 1 to be used in a formwork support system having formwork sheets and/or formwork support carriers (not shown). Telescopic support prop 1 has a leg 2 with a lower leg part 2*a* and an upper leg part 2*b* that can be adjusted between an extended position (shown in FIG. 1A) and a retracted position (shown in FIG. 4A). A support plate 2*c* for supporting a formwork sheet is arranged at an upper end of upper leg part 2*b*. At the lower end of lower leg part 2*a*, telescopic support prop 1 has a foot member 2*d* for resting on a floor of a building under construction (not shown). Upper leg part 2*b* has vertically spaced pairs of diametrically opposed through holes 3. Lower leg part 2*a*, at its upper end, has two diametrically opposed, vertically extending elongate through openings 4. A locking pin 5 is releasably connected to one of the vertically spaced pairs of through holes 3 of the upper leg part 2*b*. In the secured position shown in FIG. 1A, locking pin 5 projects through the respective pair of through holes 3 of the upper leg part 2*b* and the elongate through openings 4 of the lower leg part 2*a*. Telescopic support prop 1 further has a rotatable collar 6 engaging a threaded outer side of the lower leg part 2*a*. Rotatable collar 6 is manipulated with a handle 7 for fine adjusting the vertical position of upper leg part 2*b* secured by locking pin 5. Locking pin 5 rests on the upper side of rotatable collar 6. The length of elongate openings 4 extending vertically limits the fine-adjustment of the vertical position of upper leg part 2b. As can best be seen in FIGS. 5A-5C, locking pin 5 has a first linear portion (locking portion) 5a for connection to the respective pair of through holes 3 of the telescopic support prop 1, a second linear portion 5b and a third linear portion 5c extending in parallel to the first linear portion 5a at diametrically opposed sides of the telescopic support prop 1, respectively, a first curved portion 5d connecting first linear portion 5a to second linear portion 5b and a second curved portion (retaining portion) 5e connecting second linear portion 5b to third linear portion 5c. Retaining portion 5e is formed as a U-bend.

In the shown example, telescopic support prop 1 further has a cap 8 connected to third linear portion 5c of locking pin 5. The connection of cap 8 to locking pin 5 may be releasable or permanent. Cap 8 has a fastening sleeve 9 put over an end of third linear portion 5c of locking pin 5 and a spring 10 for bearing against leg 2. Fastening sleeve 9 has an insertion opening 11 at the one end and a front wall 12 at the other end. Insertion opening 11 allows for the arrangement of cap 8 on locking pin 5. Front wall 12 limits the movement of cap 8 onto locking pin 5. In the shown example, cap 8 is made of a plastic material, whereas locking pin 5 is made of a metal material.

Figure 5A:
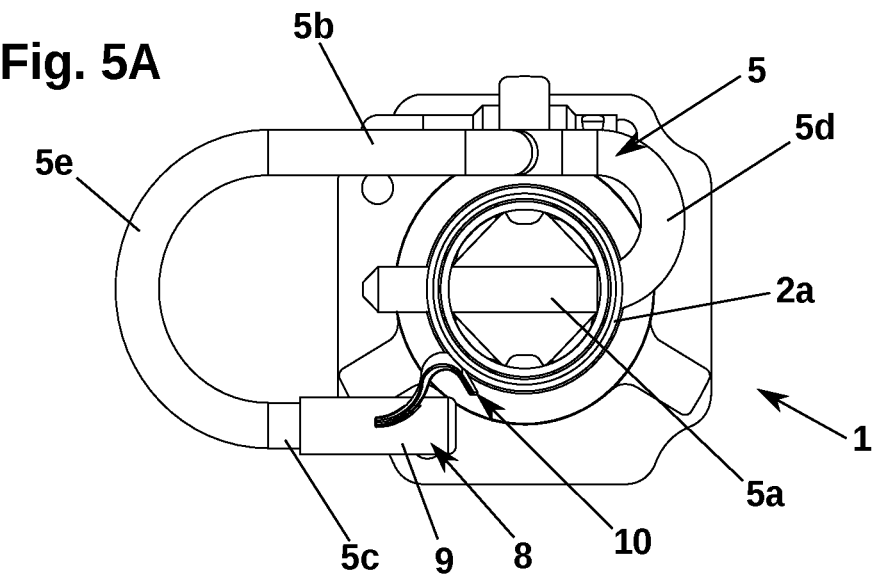
FIG. 5A is a sectional view of the telescopic support prop according to FIG. 1A.
Figure 5B:
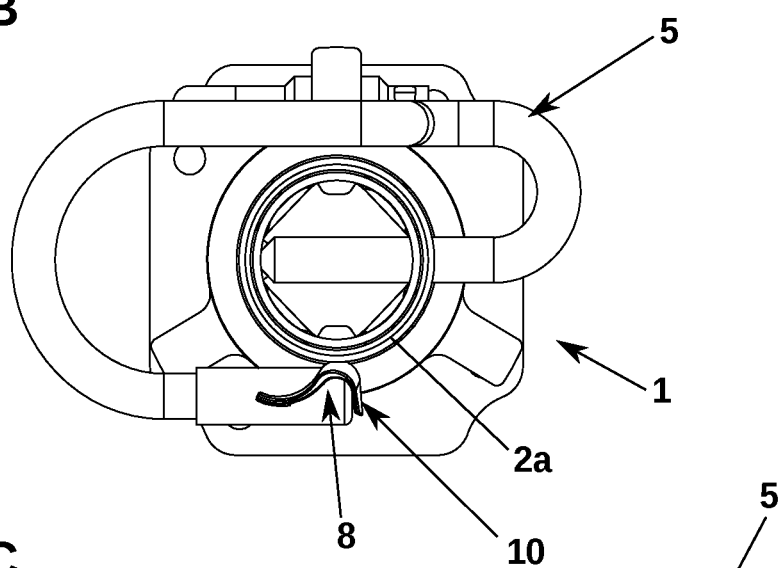
FIG. 5B is a sectional view of the telescopic support prop according to FIG. 2A.
Figure 5C:
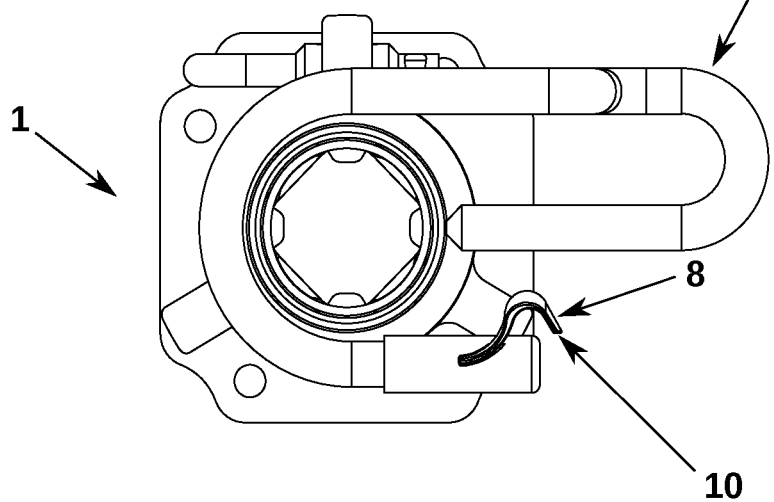
FIG. 5C is a sectional view of the telescopic support prop according to FIG. 3A.
Figure 6A:
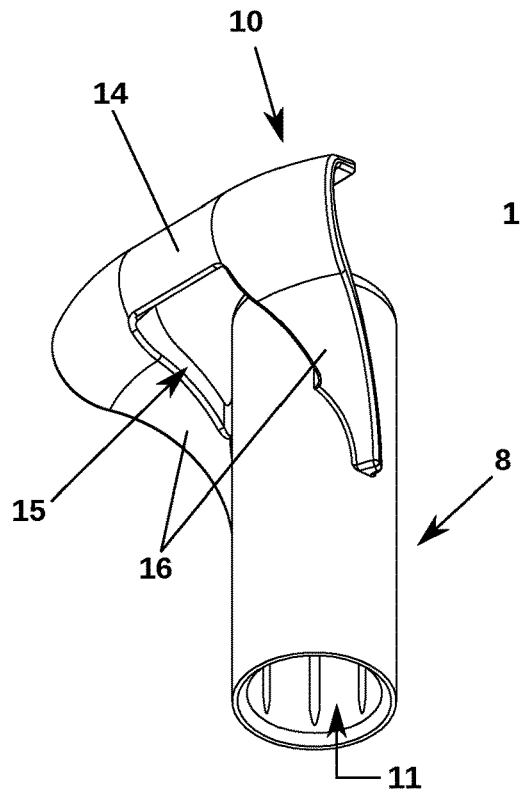
FIGS. 6A-6D are views of a first example of the detachable cap of the locking pin used in the telescopic support prop of the previous figures.
Figure 6B:
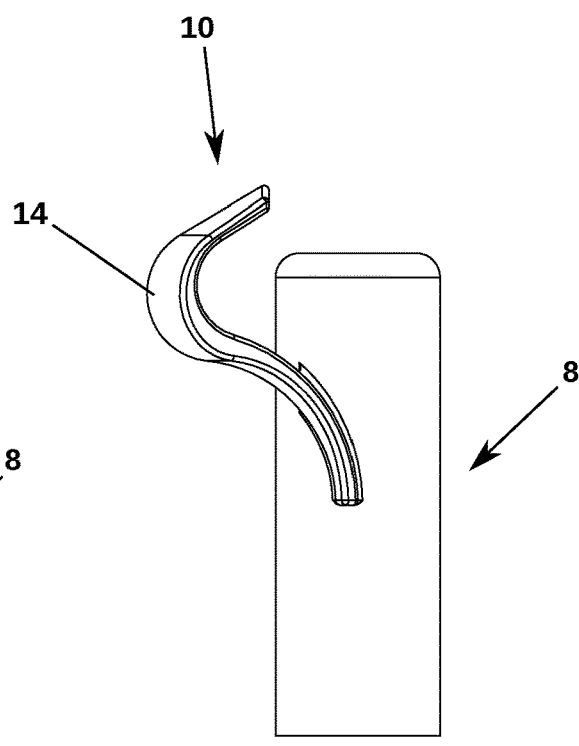
Figure 6C:
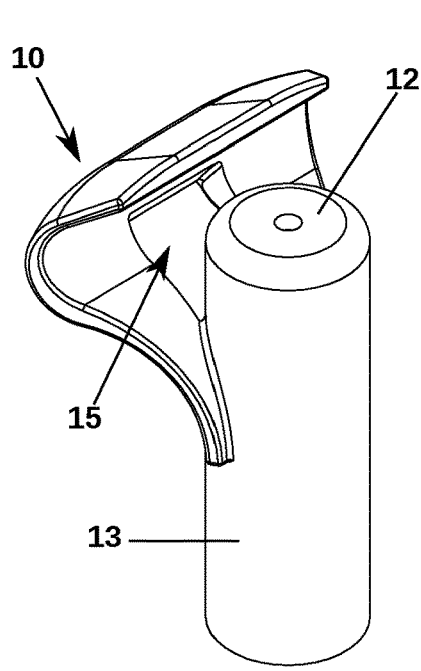
Figure 6D:
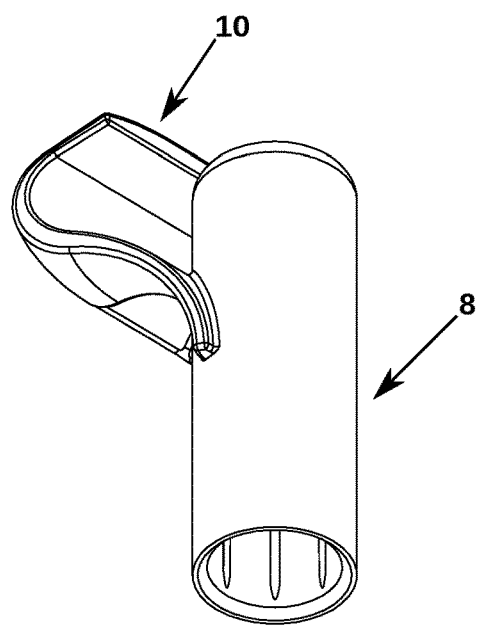
Figure 7A:
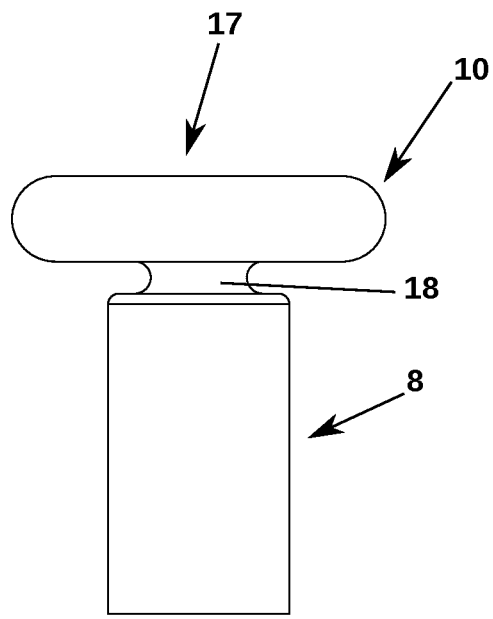
FIGS. 7A-7C are views of a second example of the detachable cap of the locking pin.
Figure 7B:
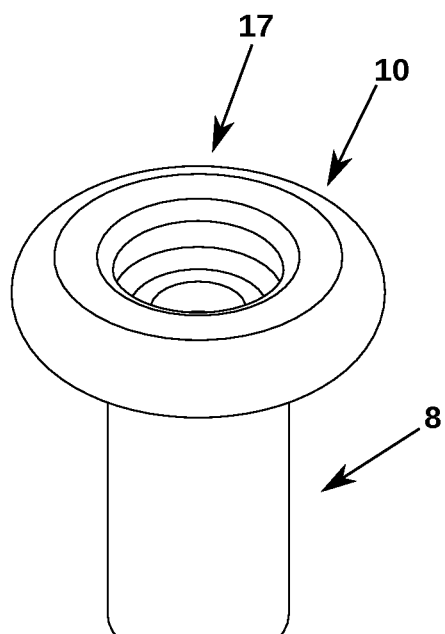
Figure 7C:
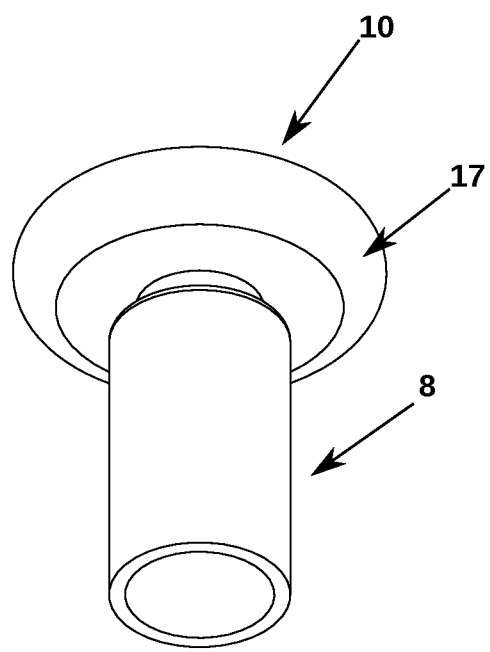
Figure 8A:
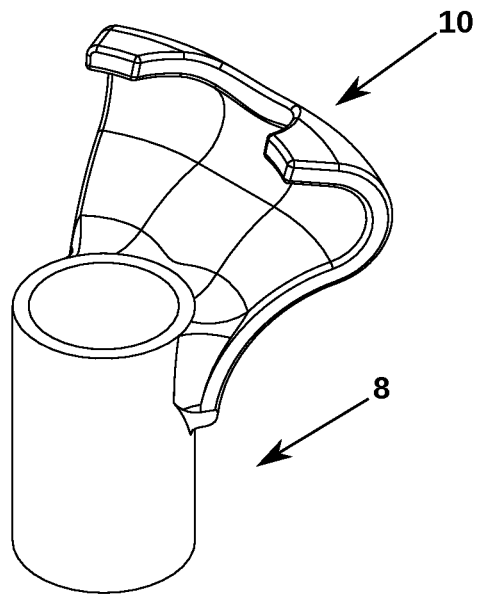
FIGS. 8A-8D are views of a third example of the detachable cap of the locking pin.
Figure 8B:
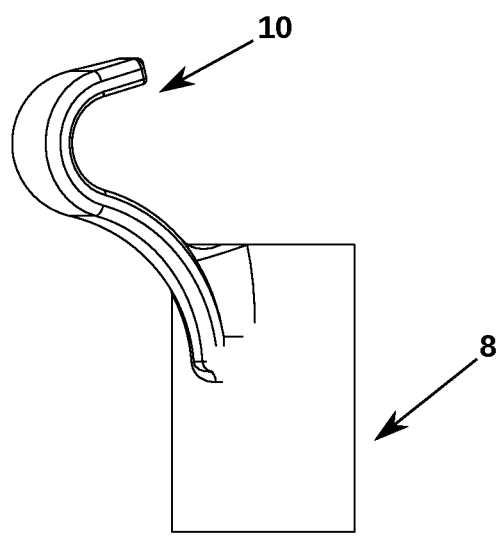
Figure 8C:
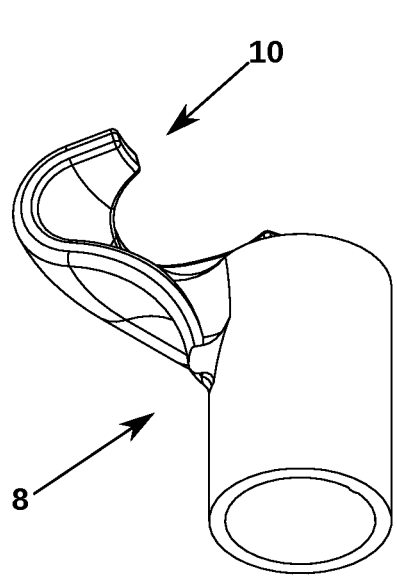
Figure 8D:
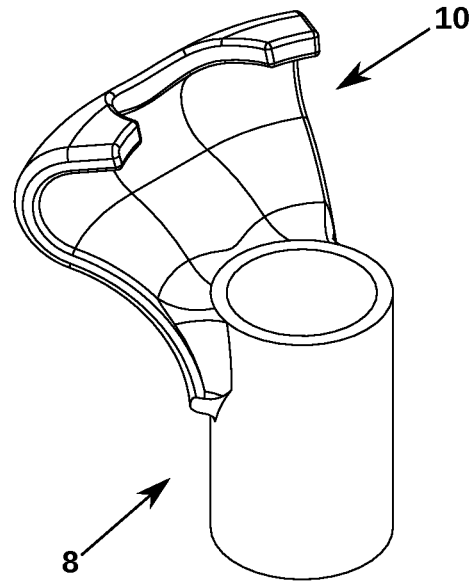

As can best be seen from FIGS. 5A-5C, spring 10 counteracts the displacement of locking pin 5 from the locking position (FIG. 5A) through the intermediate position (FIG. 5B) into the release position (FIG. 5C). For this purpose, spring 10 is elastically deflected through the contact with lower leg part 2a of formwork telescopic support prop 1 when locking pin 5 is moved horizontally to release the telescoping motion of telescopic support prop 1.

In the examples shown in FIGS. 6A-6D, 8A-8D and 9A-9D, spring 10 freely protrudes from a cylindrical outer side 13 of fastening sleeve 9 of cap 8. Furthermore, in these examples spring 10 is a flat spring. Spring 10 has a curved bearing area 14 for bearing against lower leg part 2a during release of locking pin 5. Curved bearing area 14 may be curved in two orthogonal directions (FIGS. 6a-6D; FIGS. 8A-8D). For example, curved bearing area 14 may be spherical. Alternatively, curved bearing area 14 may be cylindrical (FIGS. 9A-9D).

In the examples shown in FIGS. 6A-6D, FIGS. 8A-8D and FIGS. 9A-9D, respectively, spring 10 has a cut-out 15 which may be rectangular in shape. According to FIGS. 6A-6D and FIGS. 9A-9D, respectively, cut-out 15 extends between two flanges 16 connected to diametrically opposed sides of fastening sleeve 9. According to FIGS. 8A-8D, cut-out 15 extends inwards from a free end of spring 10.

In the example shown in FIGS. 7A-7D, spring 10 is connected to front wall 12 of fastening sleeve 9. Here, spring 10 has an annular member 17 with a central axis being collinear with a central axis of fastening sleeve 9. A flexing portion 18 connects annular member 17 to fastening sleeve 9.

Figure 10A:
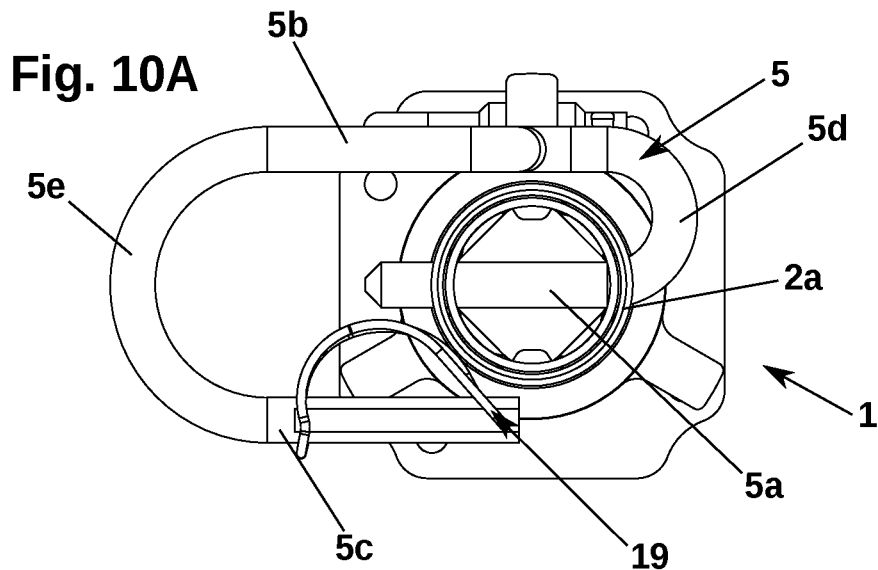
FIGS. 10A-10C are sectional views of another example of a telescopic support prop.
Figure 10B:
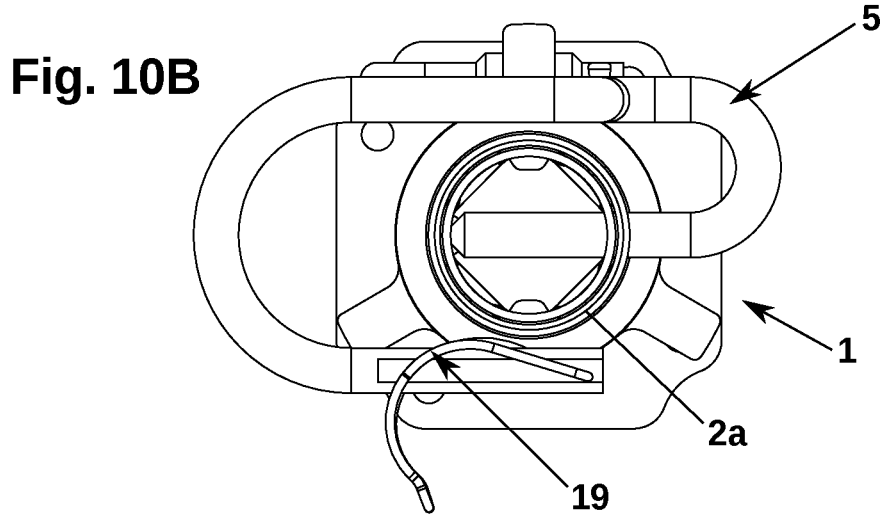
Figure 10C:
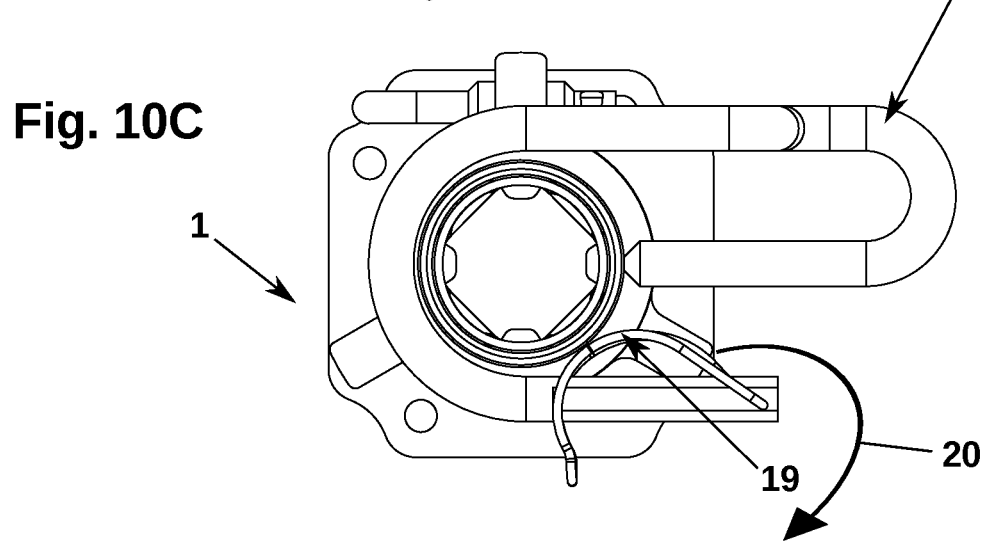
Figure 11A:
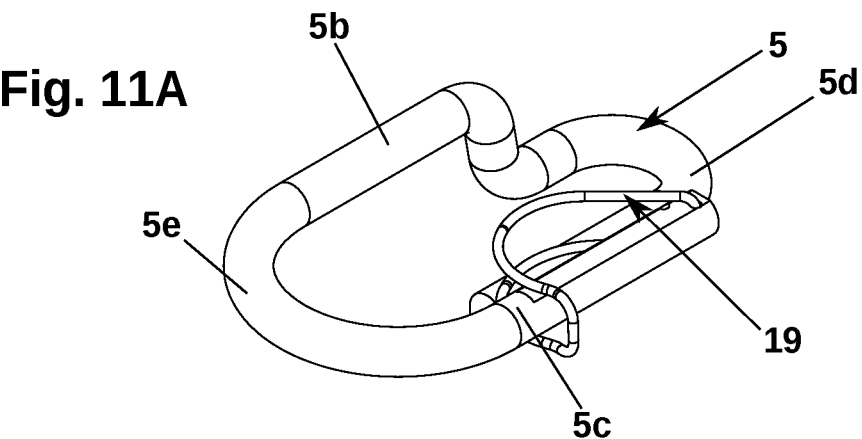
FIGS. 11A-11C are views of the locking pin used in the support prop of FIGS. 10A-10C.
Figure 11B:
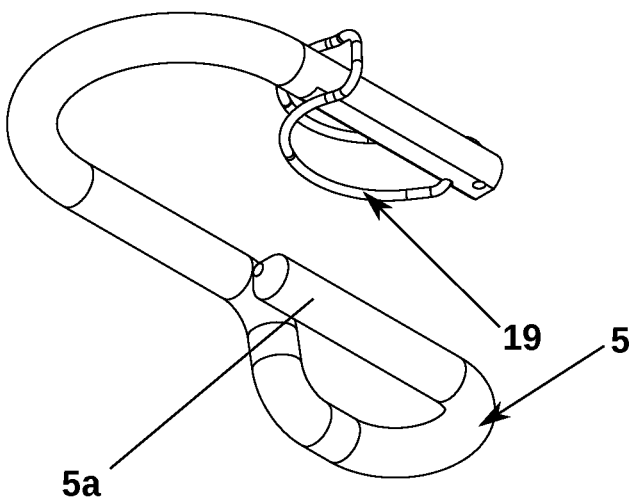
Figure 11C:
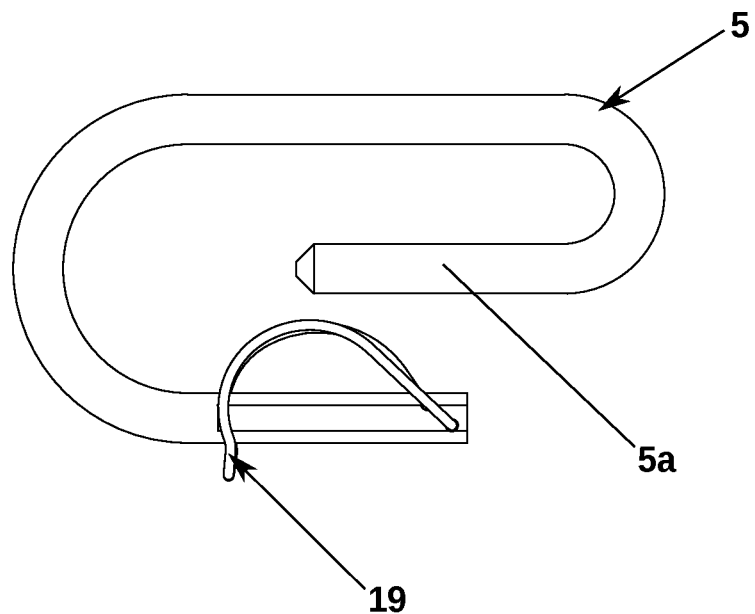

FIG. 10A-10C show another example of the telescopic support prop 1, in which the locking pin 5—as in the previous example—has first linear portion (locking portion) 5a for connection to the respective pair of through holes 3 of the telescopic support prop 1, second linear portion 5b and third linear portion 5c extending in parallel to the first linear portion 5a at diametrically opposed sides of the telescopic support prop 1, respectively, first curved portion 5d connecting first linear portion 5a to second linear portion 5b and second curved portion (retaining portion) 5e connecting second linear portion 5b to third linear portion 5c.

Furthermore, a spring 19 is pivotally connected to an end of third linear portion 5c. Spring 19 is essentially U-shaped in top view. In the shown example, spring 19 is a wire that may be elastically deformed. As can be seen from the sequence of FIGS. 10A-10C, spring 19 is engaged by the exterior of the lower leg part 2a when moving the locking pin 5 from a locked position (FIG. 10A) through an intermediate position (FIG. 10B) to an unlocked position (FIG. 10C). Furthermore, spring 19 may be pivoted outward to an inactive portion (illustrated by arrow 20 in FIG. 10C), in which spring 19 is not compressed when unlocking locking pin 5.

The invention claimed is:

1. A telescopic support prop, comprising:
    a leg with a lower leg part and an upper leg part, the upper leg part having a plurality of vertically spaced through holes,
    a locking pin releasably connected to one of the vertically spaced through holes of the upper leg part in a locked position, wherein the locking pin is formed of a linearly locking portion for insertion into one of the plurality of vertically spaced through holes of the upper leg part and a curved retention portion which comes into abutment with an exterior of the lower leg part when the locking pin is moved from the locked position to an unlocked position, and
    a cap connected to the locking pin, the cap having a fastening sleeve put over an end of the locking pin, wherein the cap further comprises a spring for engagement by an exterior of the lower leg part.

2. The telescopic support prop according to claim 1, wherein the fastening sleeve has an insertion opening at a first end and a front wall at a second end.

3. The telescopic support prop according to claim 1, wherein the cap is made of a plastic material and the locking pin is made of a metal material.

4. The telescopic support prop according to claim 1, wherein the spring freely projects from an outer side of the fastening sleeve of the cap.

5. The telescopic support prop according to claim 1, wherein the spring is a flat spring.

6. The telescopic support prop according to claim 1, wherein the spring has a curved bearing area for bearing against the leg.

7. The telescopic support prop according to claim 6, wherein the curved bearing area of the cap is cylindrical.

8. The telescopic support prop according to claim 6, wherein the curved bearing area of the cap is curved in two orthogonal directions.

9. The telescopic support prop according to claim 8, wherein the curved bearing area is spherical.

10. The telescopic support prop according to claim 1, wherein the spring has a cut-out.

11. The telescopic support prop according to claim 10, wherein the cut-out extends between two flanges connected to diametrically opposed sides of the fastening sleeve.

12. The telescopic support prop according to claim 10, wherein the cut-out extends inwards from a free end of the spring.

13. The telescopic support prop according to claim 10, wherein the cut-out is rectangular.

14. The telescopic support prop according to claim 1, wherein the spring is connected to a front wall of the fastening sleeve.

15. The telescopic support prop according to claim 1, wherein the spring has an annular member.

16. The telescopic support prop according to claim 15, wherein a central axis of the annular member of the spring is collinear with a central axis of the fastening sleeve.

17. The telescopic support prop according to claim 16, wherein a flexing portion connects the annular member to the fastening sleeve.

18. A locking pin for securing an upper leg part against a lower leg part of a telescopic support prop, comprising:
- a pin for connection to a through hole of the telescopic support prop, wherein the pin has a linear locking portion for insertion into a through hole of the upper leg part and a curved retention portion which is formed as a U-bend, and
- a cap connected to the pin, the cap having a fastening sleeve put over an end of the pin, wherein the cap further comprises a spring for bearing against the leg.

19. A telescopic support prop, comprising:
- a leg with a lower leg part and an upper leg part, the upper leg part having a plurality of vertically spaced through holes, and
- a locking pin for securing the upper leg part against axial movement relative to the lower leg part, the locking pin having a pin with a first linear portion for insertion into one of the plurality of vertically spaced through holes of the upper leg part, the pin further having a curved retention portion with an inner diameter corresponding to an outer diameter of the lower leg part, the locking pin further having a spring, the spring being engaged by an exterior of the lower leg part when moving the locking pin from a locked position to an unlocked position.

20. The telescopic support prop according to claim 19, wherein a rotatable collar is arranged on a threaded exterior of the lower leg part, a locking portion of the locking pin, in the locked position, resting on an upper side of the rotatable collar.

* * * * *